United States Patent
Suyama et al.

[11] Patent Number: 6,116,371
[45] Date of Patent: Sep. 12, 2000

[54] CABLE STEERING DEVICE

[75] Inventors: Koichi Suyama; Yoshinobu Tada; Tomoya Toyohira; Norifumi Tamura; Hiroshi Tabata; Shigeki Ehara, all of Wako, Japan

[73] Assignee: Honda Giken Kogyo Kabushiki Kaisha, Tokyo, Japan

[21] Appl. No.: 09/075,525

[22] Filed: May 11, 1998

[30] Foreign Application Priority Data

May 12, 1997 [JP] Japan .................................. 9-120718

[51] Int. Cl.[7] .................................................. B62D 5/04
[52] U.S. Cl. ........................... 180/444; 180/443; 180/400
[58] Field of Search .................................. 180/400, 417, 180/425, 430, 443, 444, 446; 74/501.6, 502, 502.4; 280/771, 774

[56] References Cited

U.S. PATENT DOCUMENTS

| | | |
|---|---|---|
| 3,747,428 | 7/1973 | Waner et al. ............................ 280/771 |
| 4,023,434 | 5/1977 | Axelsson ................................. 280/771 |
| 5,313,769 | 5/1994 | Barnes et al. ........................... 180/131 |
| 5,598,897 | 2/1997 | Sugiura .................................. 180/417 |
| 5,893,426 | 4/1999 | Shimizu et al. ........................ 180/400 |
| 5,924,517 | 7/1999 | Sugiura .................................. 180/417 |
| 5,924,520 | 7/1999 | Ehara et al. ............................ 180/444 |

*Primary Examiner*—J. J. Swann
*Assistant Examiner*—Michael Cuff
*Attorney, Agent, or Firm*—Armstrong, Westerman, Hattori, McLeland, & Naughton

[57] ABSTRACT

A cable steering device is provided such that it can be easily and reliably confirmed whether an inner cable of a Bowden cable is precisely wound around a pulley housed in a housing. Two inner cables are wound around a helical groove defined in an outer peripheral surface of a driven pulley connected to a steering wheel through a driven shaft. An opening is defined in a driven pulley housing enclosing the driven pulley, so that when the steering wheel is assembled to the driven shaft by a spline, it can be confirmed from the outside that the two inner cables have been wound precisely in two turns around the driven pulley.

2 Claims, 8 Drawing Sheets

CABLE STEERING DEVICE

BACKGROUND OF THE INVENTION

1. Field of the Invention

The present invention relates to a cable steering device in which a steering wheel and a steering gear box are connected to each other by flexible cables such as Bowden cables.

2. The Related Art

A conventional steering device for a vehicle is designed such that a steering shaft having a steering wheel at its upper end is connected at its lower end to a steering gear box, so that a steering torque inputted to the steering wheel is transmitted through the steering shaft to a rack and pinion mechanism provided within the steering gear box.

However, if the steering wheel and the steering gear box are connected to each other using the steering shaft, the following problem is encountered. That is, it is difficult to freely select the position of the steering wheel relative to the position of the steering gear box. For this reason, not only is the degree of freedom of the design limited, but also the steering gear box cannot be commonly used in both a right-side driven vehicle and a left-side driven vehicle. Moreover, there is another problem in that the vibration inputted from a road surface to a tire and the vibration of an engine are inputted through the steering shaft to the steering wheel, so that such vibrations detract from the calmness within a vehicle compartment and the riding comfort.

Therefore, in place of the conventional steering shaft, a cable steering device has been proposed which uses a flexible transmitting means such as Bowden cables (see Japanese Patent Application Laid-open No. 8-2431).

If the cable steering device is designed in the above manner, the position of the steering wheel relative to the position of the steering gear box can be freely selected and moreover, the vibration of the steering gear box is prevented from being transmitted to the steering wheel. Thus, the above-described problems can be eliminated.

In assembling such cable-type steering device, the steering wheel is coupled to the driven pulley and the follower pulley is coupled to the steering gear box, with the cables wound around the driven and follower pulleys. In this case, it is necessary to couple the driven pulley and the follower pulley to the steering wheel and the steering gear box with their phases aligned, so that when the steering wheel is brought into a neutral position, the wheels are brought correctly into their neutral positions and the steering wheel can be rotated through laterally equal angles. However, the conventional steering device suffers from a problem in that it is impossible to easily confirm from the outside whether the cables have been correctly wound around the driven pulley and the follower pulley, because the driven pulley and the follower pulley are generally housed within the housing.

SUMMARY OF THE INVENTION

The present invention has been achieved in view of the above circumstances, and it is an object of the present invention to ensure that the state of cables wound around the driven pulley and the follower pulley can be easily confirmed from the outside of the housing.

To achieve the above object, the present invention provides a cable-type steering device having a driven shaft connected to a steering wheel, a driven pulley mounted on the driven shaft, a driven pulley housing enclosing the driven pulley therein, a follower shaft connected to a steering gear box, a follower pulley mounted on the follower shaft, a follower pulley housing enclosing the follower pulley therein, and cables wound around helical grooves formed in outer peripheries of the driven and follower pulleys to transmit the rotation of the driven pulley to the follower pulley, wherein at least one of the driven and follower pulley housings is provided with an opening for confirming the wound state of the cables around the driven pulley or the follower pulley.

With the above arrangement, it is possible to easily confirm from the outside the wound state of the cables around the driven pulley and the follower pulley housed within the driven follower pulley housings, thereby precisely and easily performing the assembling of the cable steering device.

In addition, the steering wheel and the driven shaft are capable of being coupled to each other by a serration, and the device further includes the confirming means for confirming the coupled phases of the steering wheel and the driven shaft to each other.

With the above arrangement, in coupling the steering wheel and the driven shaft to each other by the serration, it is possible to reliably perform the aligning of the phases of the steering wheel and the driven shaft by the confirming means. The term "serration" used herein includes a spline.

Moreover, the follower shaft and the follower pulley are capable of being coupled to each other by a serration, and the device further includes confirming means for confirming the coupled phases of the follower shaft and the follower pulley to each other.

With the above arrangement, in coupling the follower shaft and the follower pulley to each other by the serration, it is possible to reliably perform the aligning of the phases of the follower shaft and the follower pulley by the confirming means. The term "serration" used herein includes a spline.

BRIEF DESCRIPTION OF DRAWINGS

These and other objects and advantages of the invention will become apparent and more readily appreciated from the following description of the preferred embodiment, taken in conjunction with the accompanying drawings of which.

DETAILED DESCRIPTION OF THE PREFERRED EMBODIMENT

Figure 1:
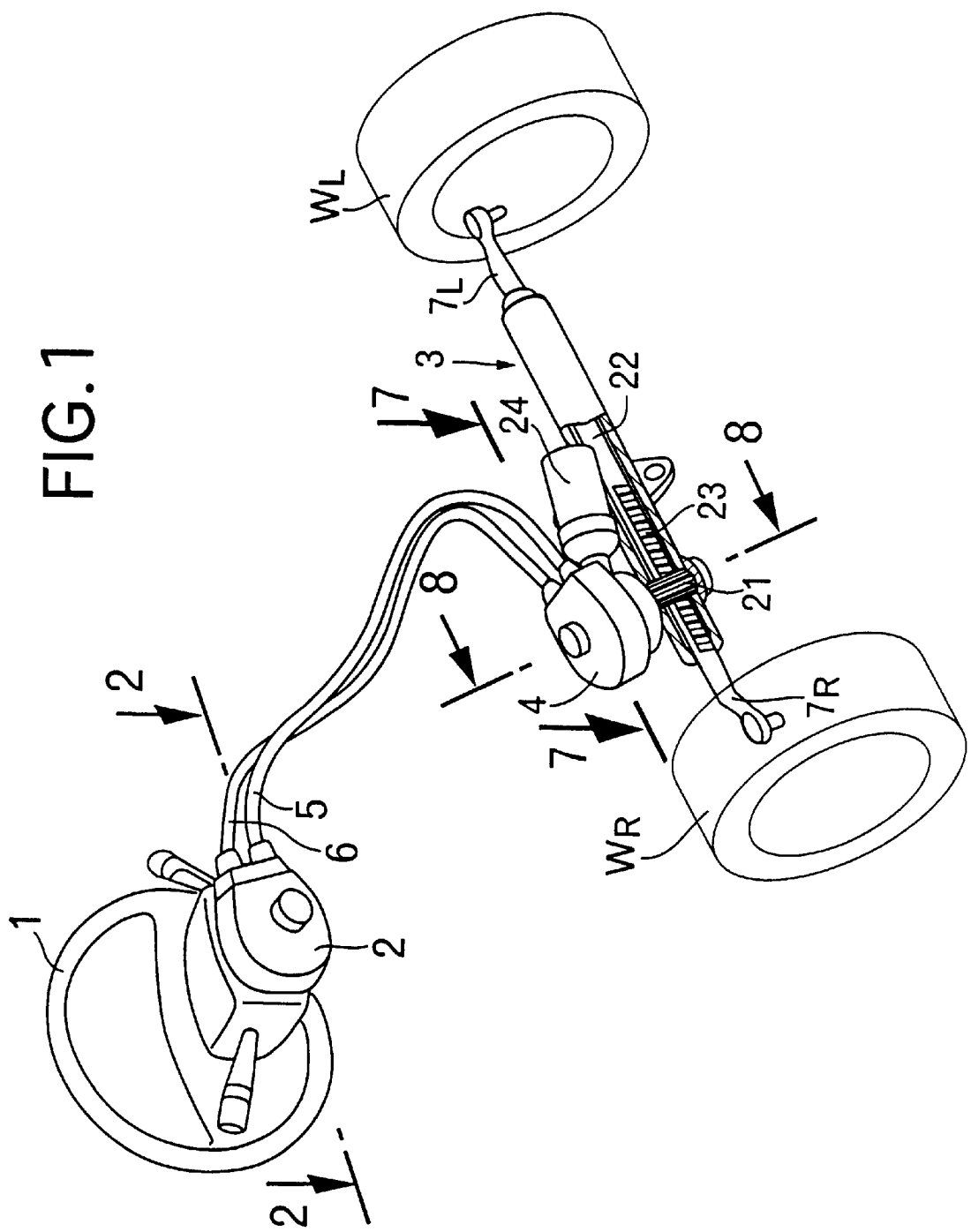
FIG. 1 is an entire perspective view of a cable steering device according to a preferred embodiment of the present invention.

The mode for carrying out the present invention will now be described by way of a preferred embodiment, an example of which is shown in the accompanying drawings, wherein like reference numerals refer to like elements throughout.

FIGS. 1 to 10 depict an example of a preferred embodiment of the present invention. As shown in FIG. 1, a driven pulley housing 2 provided in front of a steering wheel 1 of an automobile and a follower pulley housing 4 provided above a steering gear box 3 are connected to each other by two Bowden cables 5 and 6. Tie rods $7_L$ and $7_R$ extending from opposite ends of the steering gear box 3 in leftward and rightward directions of a vehicle body are connected to knuckles (not shown) supporting left and right wheels $W_L$ and $W_R$.

Figure 2:
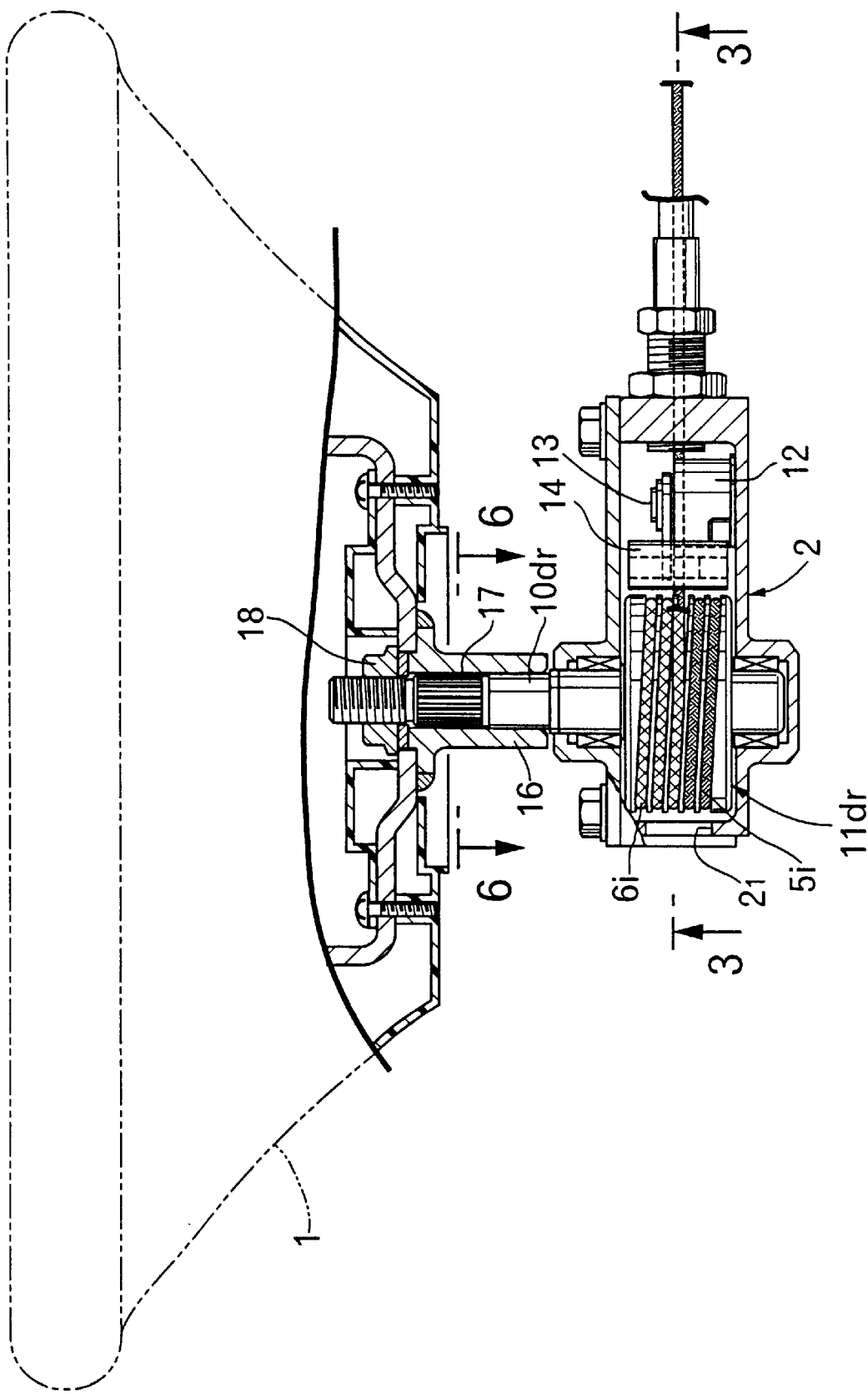
FIG. 2 is an enlarged sectional view taken along a line 2—2 in FIG. 1.
Figure 3:
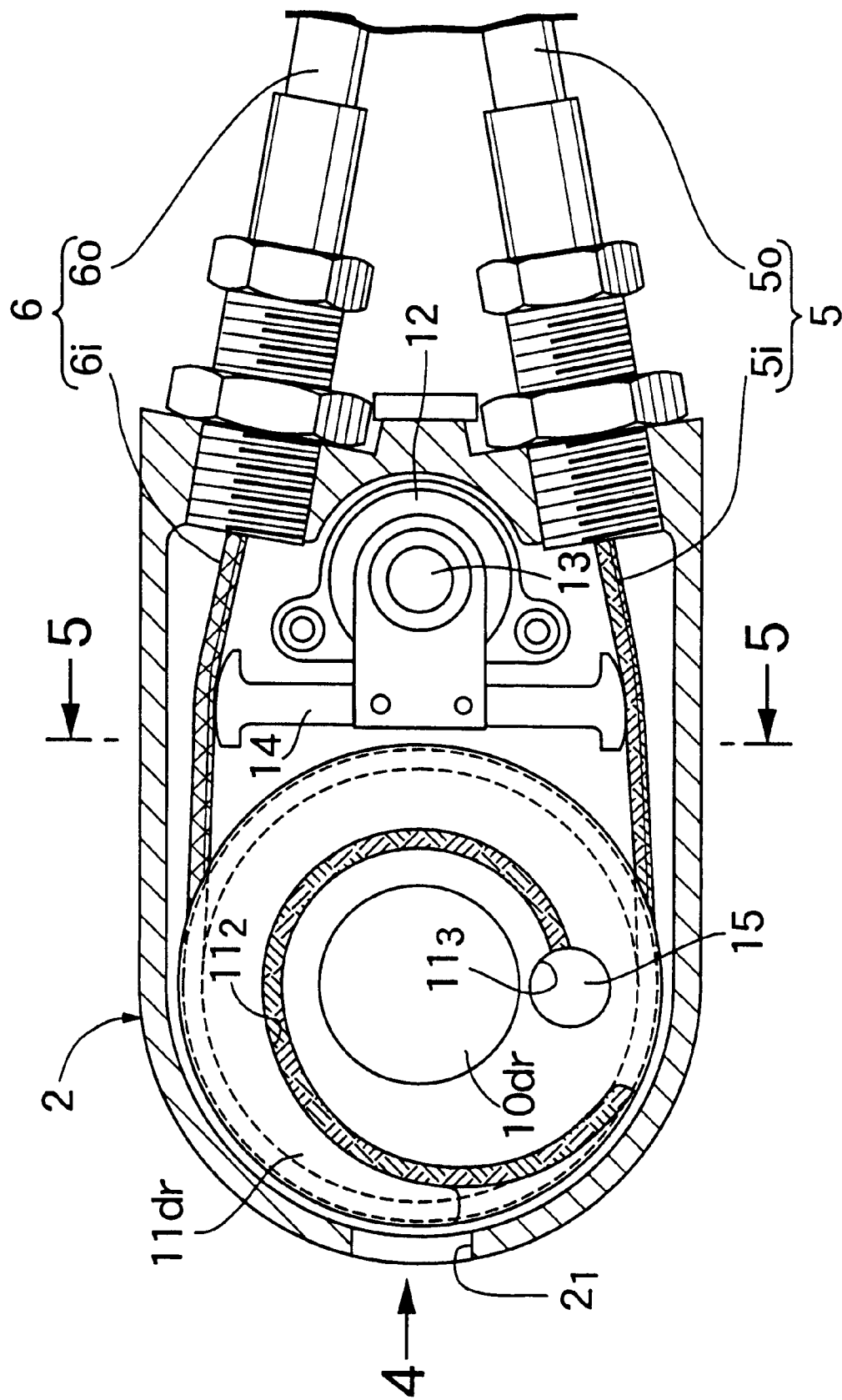
FIG. 3 is a sectional view taken along a line 3—3 in FIG. 2.

As shown in FIGS. 2 and 3, a driven pulley 11dr is integrally formed on a driven shaft 10dr which is supported rotatably in the driven pulley housing 2 and rotated with the steering wheel 1. The two Bowden wires 5 and 6 comprise outer tubes 5o, 6o, and inner cables 5i, 6i housed slidably in the interior of the outer tubes, respectively. One end of each of the inner cables 5i, 6i is fixed by winding the inner cable about two times along a helical groove $11_1$ (see FIG. 5A) formed around an outer periphery of the driven pulley 11dr, embedding the inner cable into a fixing groove $11_2$ (see FIG. 3) formed in a side of the driven pulley 11dr, and fitting a pin 15 provided at a tip end of the inner cable into a pin hole $11_3$ (see FIG. 3) made in the side of the driven pulley 11dr. One end of each of the outer tubes 5o and 6o is fixed to the driven pulley housing 2.

A potentiometer 12 is mounted within the driven pulley housing 2 in such a manner that it is sandwiched between two inner cables 5i and 6i. Opposite ends of a T-shaped arm 14 fixed to a detection shaft 13 of the potentiometer 12 slidably contact with the two inner cables 5i and 6i. An elliptic opening $2_1$ (see FIG. 4) is defined in the driven pulley housing 2 on a side opposite from the potentiometer 12 with respect to the driven shaft 10dr. The elliptic opening $2_1$ provides a view of the two Bowden wires 5 and 6 resting in the helical grooves $11_1$. Thus, the wound states of the two inner cables 5i and 6i around the driven pulley 11dr can be confirmed through the opening $2_1$.

Figure 6:
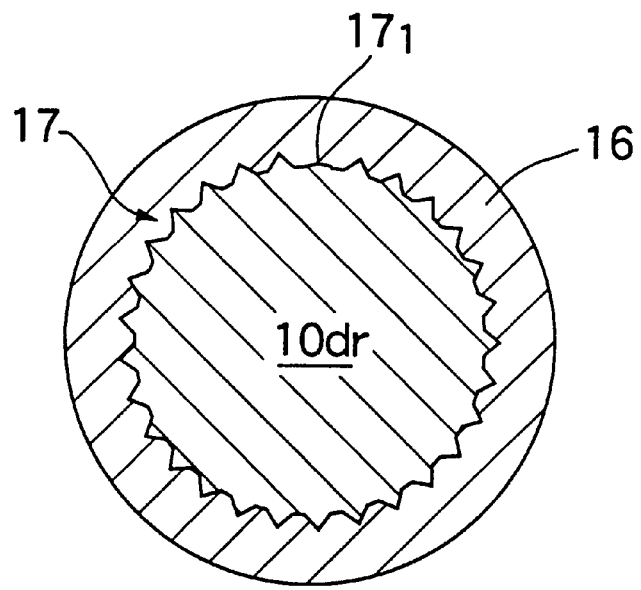
FIG. 6 is an enlarged sectional view taken along a line 6—6 in FIG. 2.
Figure 7:
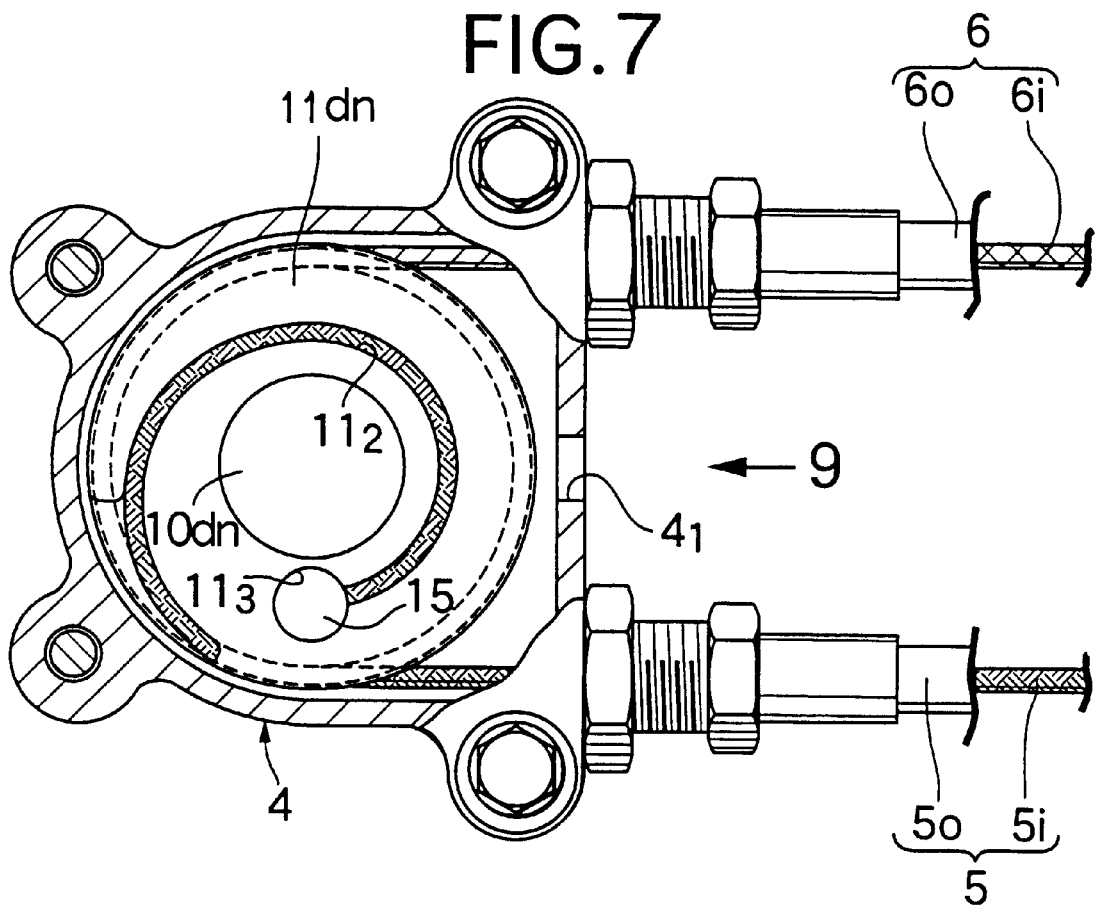
FIG. 7 is an enlarged sectional view taken along a line 7—7 in FIG. 1.

As can be seen from FIG. 2, a steering wheel boss 16 centrally provided in the steering wheel 1 is coupled to the driven shaft 10dr protruding from the driven pulley housing 2 by a serration 17 and is fixed by a nut 18. As shown in FIG. 6, the serration 17 for coupling the driven shaft 10dr and the steering wheel boss 16 to each other includes a tooth-lacking portion $17_1$ as a confirming means, so that the driven shaft 10dr and the steering wheel boss 16 are always coupled to each other in fixed phases.

As shown in FIGS. 1 and 7 to 9, a follower pulley 11dn is fixed through a serration 19 to a follower shaft 10dn which is rotatably supported in the follower pulley housing 4. The other end of each of the inner cables 5i and 6i is fixed by winding the inner cable about two times along a helical groove $11_1$ (see FIG. 8) formed around an outer periphery of the follower pulley 11dn, embedding the inner cable into a fixing groove $11_2$ (see FIG. 7) formed in a side of the follower pulley 11dn, and further embedding a pin 15 provided at a tip end of the inner cable into a pin hole $11_3$ (see FIG. 7) made in the side of the follower pulley 11dn. The other ends of the outer tubes 5o and 6o of the Bowden wires 5 and 6 are fixed to the follower pulley housing 4. An elliptic opening $4_1$ is defined in the follower pulley housing 4 in a position providing a view of the two Bowden wires 5 and 6 resting in the helical grooves $11_1$. Thus, the wound states of the inner cables 5i and 6i around the follower pulley 11dn can be confirmed through the opening $4_1$.

A pinion 21 is provided at a tip end of the follower shaft 10dn protruding from the follower pulley housing 4 into the steering gear box 3. The pinion 21 is meshed with a rack 23 formed on a steering rod 22 which is laterally slidably supported within the steering gear box 3.

A motor 24 for a power steering operation as a power assisting means is supported in the follower pulley housing 4, and a worm 26 provided on an output shaft 25 of the motor 24 for the power steering operation is meshed with a worm wheel 27 mounted on the follower shaft 10dn. Therefore, a torque of the motor 24 for the power steering operation is transmitted to the follower shaft 10dn through the worm 26 and the worm wheel 27.

Figure 10:
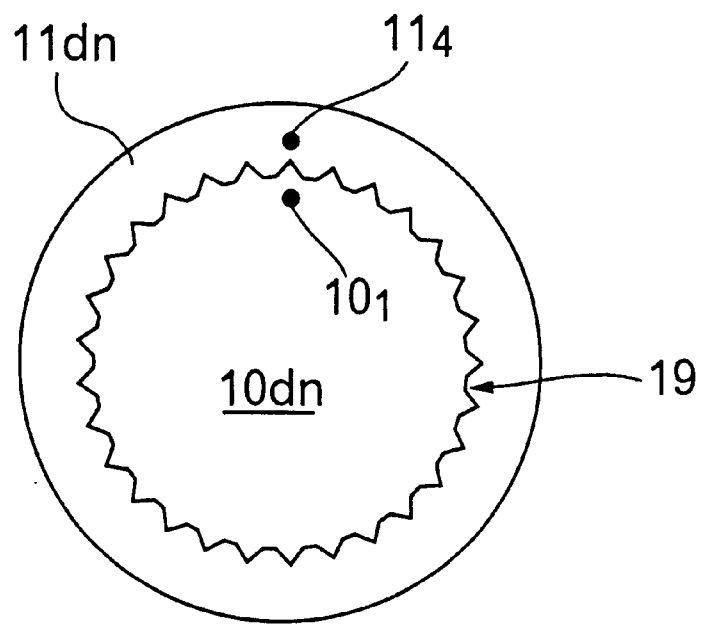
FIG. 10 is a view taken in a direction of an arrow 10 in FIG. 8.

As can be seen from FIG. 10, corresponding marks $10_1$ and $11_4$ are mounted on an end face of the follower shaft 10dn and an end face of the follower pulley 11dn, so that when the follower pulley 11dn is coupled to the follower shaft 10dn by the serration 19, their phases are maintained uniformly.

The operation of the present invention having the above-described arrangement is described below.

When the cable-type steering device is to be assembled, it is necessary to precisely match the neutral position of the steering wheel 1 with the neutral position of the wheels $W_L$ and $W_R$. To this end, the assembling of the cable steering device is carried out in a procedure which is described below.

First, the driven shaft 10dr and the steering wheel boss 16 are coupled to each other by the serration 17. In this case, the driven shaft 10dr and the steering wheel boss 16 are always coupled to each other in fixed phases (see FIG. 6) by the tooth-lacking portion $17_1$ provided in the serration 17. Then, the follower pulley 11dn is coupled to the follower shaft 10dn by the serration 19. At this time, the mark $10_1$ provided on the follower shaft 10dn is aligned with the mark $11_4$ provided on the follower pulley 11 (see FIG. 10) so that the coupled phases of the follower shaft 10dn and the follower pulley 11dn becomes uniform. In the embodiment, the aligning of the phases of the driven shaft 10dr and the steering wheel boss 16 is carried out by the tooth-lacking portion $17_1$ of the serration 17, and the aligning of the phases of the follower shaft 10dn and the follower pulley 11dn is carried out by the marks $10_1$ and $11_4$. These phase-aligning means can be properly replaced with other means, or changed.

Figure 5A:
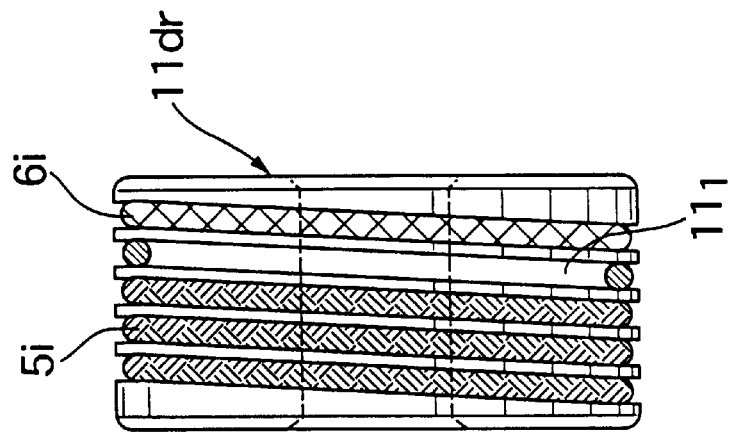
FIG. 5 is a sectional view taken along a line 5—5 in FIG. 3.
Figure 5B:
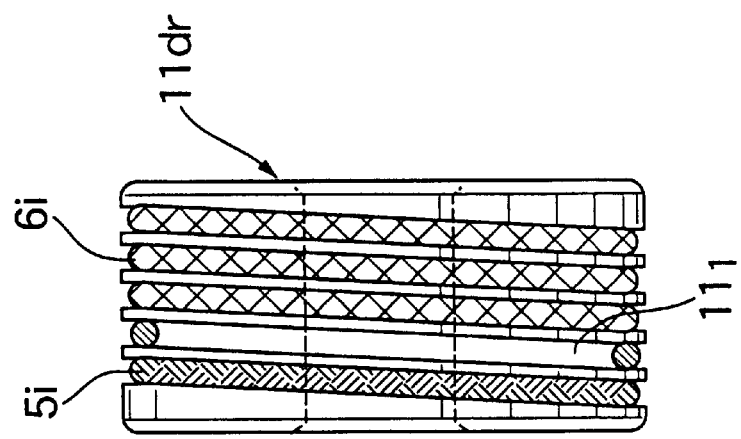
Figure 5C:
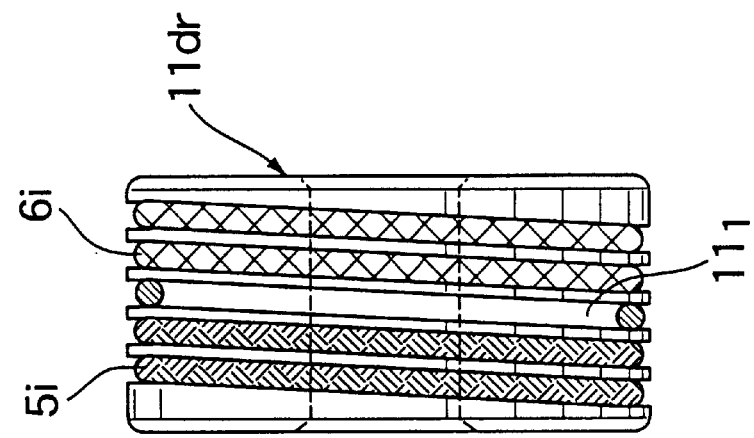

If the follower shaft 10dn and the follower pulley 11dn are coupled by the serration 19 with both the steering wheel 1 and the wheels $W_L$ and $W_R$ fixed in their neutral positions, the assembling of the cable-type steering device must be correctly completed, but in a case which is described below, there is a possibility that an assembling failure may be generated. Namely, when both of the steering wheel 1 and the wheels $W_L$ and $W_R$ are in their neutral positions, both the inner cables 5i and 6i should be in states in which they have been wound in two turns around the helical groove $11_1$ in the driven pulley 11dr, as shown in FIG. 5A. However, if the driven pulley 11dr has been rotated in one rotation in a leftward or rightward direction, there is a possibility of an occurrence of an assembly-failure in which one of the inner cables 5i and 6i is wound in one turn around the helical groove $11_1$ in the driven pulley 11dr, and the other inner cable is wound in three turns, as shown in FIGS. 5B and 5C.

Figure 4:
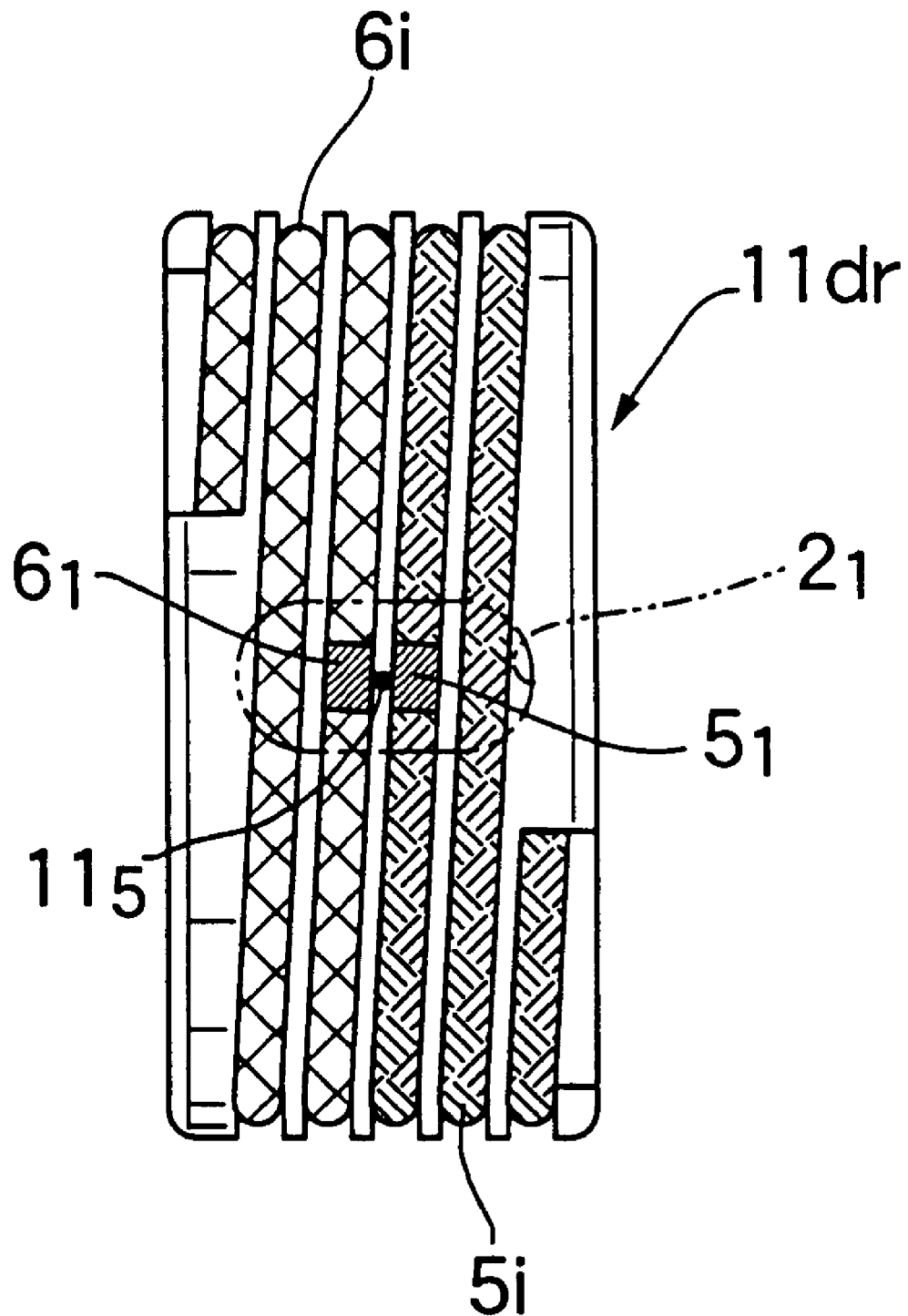
FIG. 4 is a view taken in a direction of an arrow 4 in FIG. 3.

Therefore, in the present embodiment, before the follower shaft 10dn and the follower pulley 11dn are to be coupled to each other by the serration 19, one looks inside the driven pulley housing 2 through the opening $2_1$ to ascertain whether the wound states of the inner cables $5i$ and $6i$ around the driven pulley $11dr$ are in their normal states as shown in FIG. 4. In FIG. 4, the inner cables $5i$ and $6i$ are represented with different mesh patterns, so that they can be discriminated from each other. In practice, however, the inner cables $5i$ and $6i$ are identical in external appearance to each other and cannot be discriminated from each other and hence, it is impossible to ascertain whether each of the inner cables $5i$ and $6i$ has been wound in two turns. Therefore, as shown in FIG. 4, when marks $5_1$ and $6_1$ provided on the inner cables $5i$ and $6i$ are aligned with the mark $11_5$ provided on the driven pulley $11dr$, the inner cables $5i$ and $6i$ and the driven pulley are deemed to be in their normal states.

Figure 9:
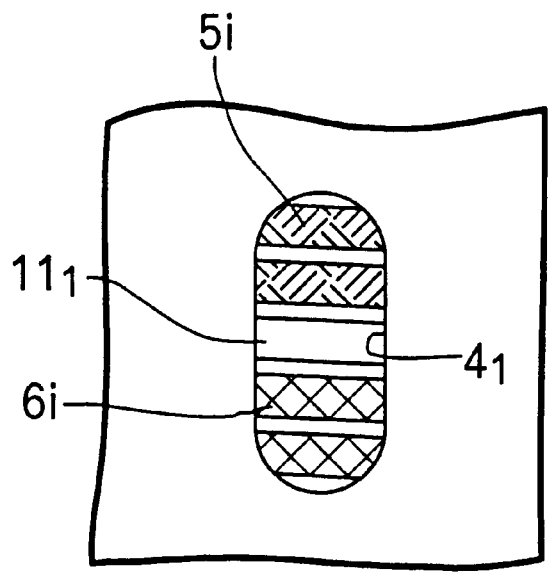
FIG. 9 is a view taken in a direction of an arrow 9 in FIG. 7.

When the inner cables $5i$ and $6i$ have been normally wound around the driven pulley $11dr$, one then looks inside the follower pulley housing 4 through the opening $4_1$ to ascertain the normal state wherein the inner cables $5i$ and $6i$ have been wound in two turns around the helical grooves $11_1$ in the follower pulley $11dn$, respectively, as shown in FIG. 9. In this case, the helical groove $11_1$ between both of the inner cables $5i$ and $6i$ is exposed. Therefore, even if no marks are provided on the follower pulley $11dn$ and the inner cables $5i$ and $6i$, the inner cables $5i$ and $6i$ can be discriminated from each other, and the number of winding turns of the inner cables $5i$ and $6i$ can be ascertained.

In this manner, the wound states of the inner cables $5i$ and $6i$ around the driven pulley $11dr$ and the follower pulley $11dn$ can be simply ascertained through the openings $2_1$ and $4_1$ respectively in the driven pulley housing 2 and in the follower pulley housing 4, and hence, the occurrence of mis-assembly can be reliably prevented.

Figure 8:
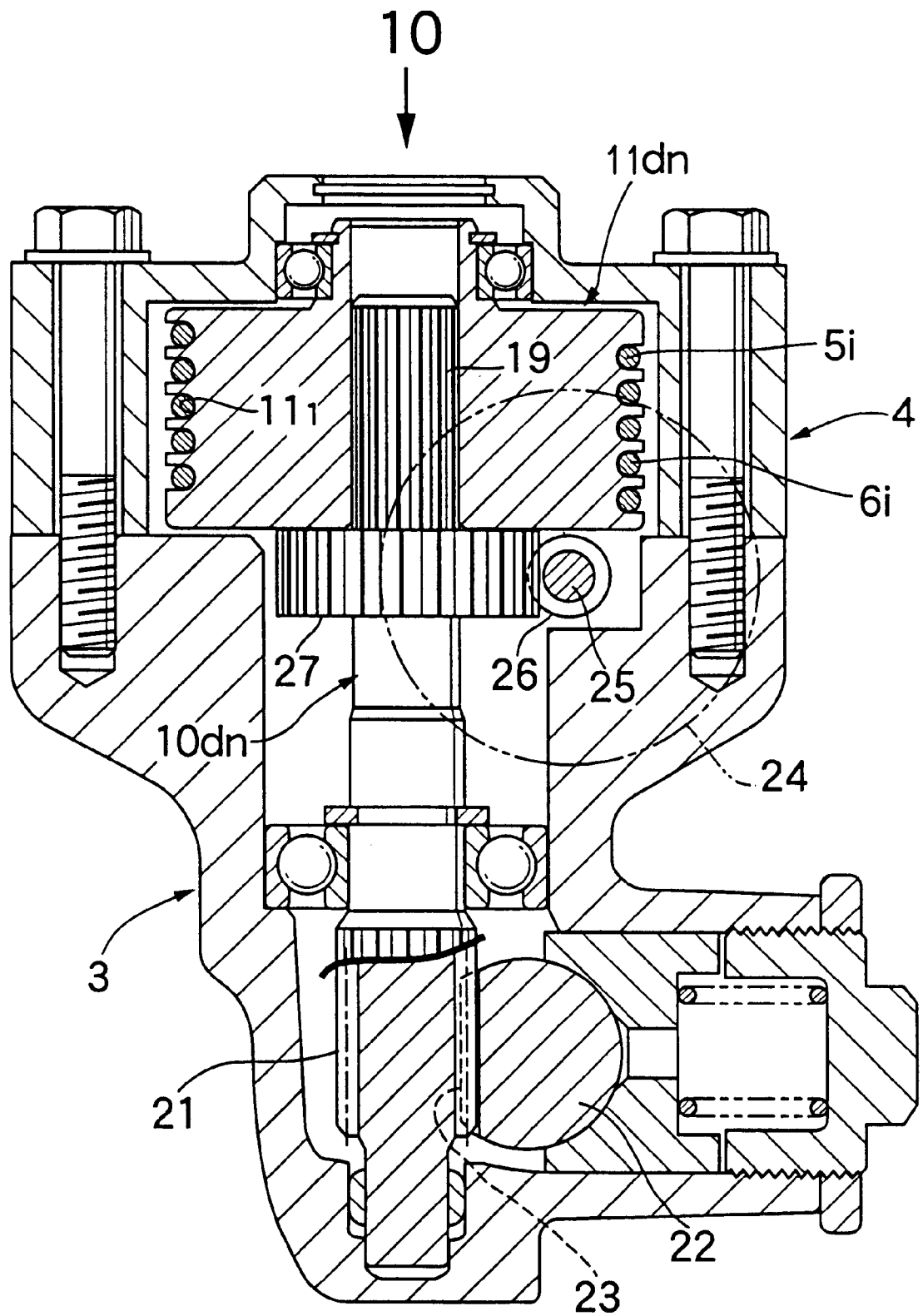
FIG. 8 is an enlarged sectional view taken along a line 8—8 in FIG. 1.

When the steering wheel 1 is operated to rotate the driven shaft $10dr$ in order to turn the vehicle, one of the inner cables $5i$ and $6i$ of the Bowden wires 5 and 6 wound around the driven pulley $11dr$ is drawn, and the other inner cable is slackened. This causes the rotation of the driven pulley $11dr$ to be transmitted to the follower pulley $11dn$. As a result, the follower shaft $10dn$ shown in FIG. 8 is rotated to transmit the steering torque to the wheels $W_L$ and $W_R$ through the pinion 21, the rack 23 and the steering rod 22 in the steering gear box 3.

In addition, the tension of one of the inner cables $5i$ and $6i$ is increased, and the tension of the other inner cable is decreased. This causes the detection shaft 13 of the potentiometer 12 connected to the inner cables $5i$ and $6i$ through the arm 14 to be rotated, whereby the steering torque of the steering wheel 1 is detected on the basis of an output from the potentiometer 12.

The steering torque detected in the above manner is subjected to a calculating operation along with another control signal such as a vehicle speed signal in the electronic control unit. On the basis of the result of the calculating operation, the steering assisting torque generated by the motor 24 for the power steering operation is feedback-controlled, so that the difference between the tensions of the inner cables $5i$ and $6i$ is substantially constant. When the motor 24 for the power steering operation generates the torque in this manner, the follower shaft $10dn$ is rotated through the worm 26 and the worm wheel 27 to assist the driver's operation of the steering wheel 1.

Although a preferred embodiment of the present invention has been described in detail, it will be understood that the present invention is not limited to the above-described embodiment, and various modifications in design may be made without departing from the subject matter of the present invention.

For example, although the openings $2_1$ and $4_1$ have been provided in both of the driven pulley housing 2 and the follower pulley housing 4 in the embodiment, just one of the openings $2_1$, $4_1$ may be provided in either the driven pulley housing 2 or the follower pulley housing 4. This is because if both of the inner cables $5i$ and $6i$ have been uniformly wound around either one of the driven pulley $11dr$ or the follower pulley $11dn$, it ensures that both of the inner cables $5i$ and $6i$ have been uniformly wound around the other pulley, insofar as the length of the inner cables $5i$ and $6i$ has been set precisely.

As discussed above, according to the present invention, the opening for confirming the wound states of the cables around the driven pulley or the follower pulley is provided in at least one of the driven pulley housing or the follower pulley housing. Therefore, it is possible to easily confirm the wound states of the cables around the driven pulley or the follower pulley from the outside of the pulley housings, thereby precisely and easily performing the assembling of the cable-type steering device.

In addition, the steering wheel and the driven shaft are capable of being coupled to each other by the serration, and the device further includes the confirming means for confirming the coupled phases of the steering wheel and the driven shaft to each other. Therefore, when the steering wheel and the driven shaft is coupled to each other by the serration, it is possible to reliably perform the aligning of the phases of the steering wheel and the driven shaft.

Moreover, the follower shaft and the follower pulley are capable of being coupled to each other by the serration, and the device further includes the confirming means for confirming the coupled phases of the follower shaft and the follower pulley to each other. Therefore, when the follower shaft and the follower pulley are coupled to each other by the serration, it is possible to reliably perform the aligning of the phases of the follower shaft and the follower pulley.

What is claimed is:

1. A cable steering device comprising:

a driven shaft connected to a steering wheel;

a driven pulley mounted on said driven shaft;

a driven pulley housing enclosing said driven pulley therein;

a follower shaft connected to a steering gear box;

a follower pulley mounted on the follower shaft;

a follower pulley housing enclosing said follower pulley therein;

cables wound around helical grooves formed in outer peripheries of the driven and follower pulleys to transmit a rotation of the driven pulley to the follower pulley, wherein at least one of said driven and follower pulley housings is provided with an opening, each of said cables having a first mark for identifying relative positions of said cables to confirm a wound state of said cables relative to a second mark on at least one of said pulleys, said first and second marks being externally visible through said opening.

2. A cable steering device comprising:

a driven shaft connected to a steering wheel;

a driven pulley mounted on said driven shaft;

a driven pulley housing enclosing said driven pulley therein;

a follower shaft connected to a steering gear box;

a follower pulley mounted on the follower shaft;

a follower pulley housing enclosing said follower pulley therein;

cables wound around helical grooves formed in outer peripheries of the driven and follower pulleys to transmit a rotation of the driven pulley to the follower pulley, wherein at least one said driven and follower pulley housings has an opening revealing said cables being wound around the helical grooves in the pulleys, each of said cables having a first mark for identifying relative positions of said cables to confirm a wound state of said cables relative to a second mark on at least one of said pulleys, said first and second marks being externally visible through said opening.

* * * * *